United States Patent [19]

Fahlen et al.

[11] 4,028,592

[45] June 7, 1977

[54] MEANS FOR INCREASING THE STABILITY IN HIGH-VOLTAGE POWER SUPPLY NETWORKS

[75] Inventors: Nils Fahlen, Vasteras; Asle Schei, Ludvika, both of Sweden

[73] Assignee: ASEA Aktiebolag, Vasteras, Sweden

[22] Filed: Dec. 24, 1974

[21] Appl. No.: 536,227

Related U.S. Application Data

[63] Continuation of Ser. No. 148,110, Nov. 21, 1973, abandoned.

[30] Foreign Application Priority Data

Dec. 22, 1972 Sweden .......................... 16863/72

[52] U.S. Cl. .................................. 361/16; 361/15
[51] Int. Cl.² ........................................ H02H 7/16
[58] Field of Search ............. 317/12 A, 12 R, 12 B

[56] References Cited

UNITED STATES PATENTS

| | | | |
|---|---|---|---|
| 2,504,860 | 4/1950 | Marbury | 317/12 A |
| 2,569,133 | 9/1951 | Podolsky | 317/12 A |
| 2,819,429 | 1/1958 | Skeats | 317/12 A |
| 2,862,152 | 11/1958 | Ryden | 317/12 A |
| 2,878,428 | 3/1959 | Bockman et al. | 317/12 A |
| 2,900,578 | 8/1959 | Marbury | 317/12 A |

FOREIGN PATENTS OR APPLICATIONS

| | | | |
|---|---|---|---|
| 860,307 | 9/1939 | France | 317/12 A |

OTHER PUBLICATIONS

"Series Capacitor Installations," By W. C. Bloomquist, 3/1945, Power Plant Engineering, pp. 94–97.

*Primary Examiner*—J D Miller
*Assistant Examiner*—Patrick R. Salce
*Attorney, Agent, or Firm*—Watson Cole Grindle & Watson

[57] ABSTRACT

Series capacitor blanks are inserted in high-voltage alternating current network systems in order to improve the stability of the system. Such capacitor banks are provided with a shunt-circuit for short-circuiting the capacitors if the voltage across them increases above a predetermined value at which the capacitors may be damaged or destroyed. When, in the event of a disturbance in the network, said shunt-circuit has short-circuited the capacitors, the stabilizing ability of the capacitors is gone. In order to avoid this, the capacitor bank is provided with a further shunt circuit including non-linear resistors, said resistors having a very high resistance as long as the voltage across the capacitor bank is lower than a predetermined value. Said value is higher than the noraml operating voltage of the capacitors but lower than the voltage at which the first shunt circuit short-circuits the capacitor bank. Above said predetermined value the resistance of the non-linear resistors will decrease in order to keep the voltage across the capacitor bank below the value at which said shunt circuit becomes effective.

4 Claims, 6 Drawing Figures

MEANS FOR INCREASING THE STABILITY IN HIGH-VOLTAGE POWER SUPPLY NETWORKS

This is a continuation of application Ser. No. 148,110, filed Nov. 21, 1973, now abandoned.

BACKGROUND OF THE INVENTION

1. Field of the Invention

The invention relates to an arrangement for increasing the stability in high-voltage networks.

2. The Prior Art

In order to increase the stability of high-voltage electric power supply networks or in order to be able to increase the transmitting capability of a power line while maintaining the stability, series capacitors are used, which reduce the inductive line reactance, thus making the lines electrically shorter and stronger. However, arranging series capacitors involves the complication that, as a consequence of overcurrents and transients in the case of line faults, the capacitor will be subjected to overvoltages which may damage and completely destroy it and against which it must be protected. Such a protective device comprises a spark gap which ignites instantaneously and short-circuits the capacitor when the protection level determined by the ignition voltage of the spark gap has been reached. This means that the compensating effect of the series capacitor is lost at the moment it is most needed, that is, during the occurrence of the fault itself. Furthermore, the protective gaps require a certain time for de-ionization after they have been extinguished, which delays the reinsertion of the capacitor.

If the capacitor is dimensioned so that during normal operational conditions it compensates the line reactance with a sufficient margin, it may however happen that a disturbance, which has caused a disconnection of the capacitor, is so strong that the stability is lost during the period for which the capacitor has been disconnected and that the capacitor is not able to restore the stability after reconnection. In order to eliminate such a risk, the capacitor is made so large that it may safely restore the stability after connection. This arrangement does of course involve a corresponding increase in the cost of installation of the capacitor and is therefore made necessary by the demand that the transmission stability should always be assured.

The protective spark gaps which are used for short-circuiting series capacitors are of essentially two kinds, self-extinguishing and non-self-extinguishing gaps. Non-self-extinguishing gaps require parallel connections with current transformers, relays and circuit-breakers in such a way that, when the gap is ignited, a circuit breaker is closed and short-circuits the gap which then expires. When the gap has been de-ionized, which is a question of statistical nature, the breaker is to open and restore the capacitor. Considering, among other things, the fact that the use of non-self-extinguishing gaps requires breakers for extinguishing the gap and restoration of the capacitor and the fact that the breaker is the weakest link in a power system, there is always a certain risk that the restoration of the capacitor may fail and that the stability is lost, which may involve considerable damage and expense. Self-extinguishing gaps, with or without additional elements, have the ability of being able to expire a short time after the fault has been disconnected and the line current has decreased to the normal value. In this way there is generally no need of parallel-working devices such as circuit breakers, which must be regarded as an important advantage.

One of the disadvantages of these gaps, however, is that for certain types of faults occurring within certain lines it must be assumed that the gap is ignited and extinguished each half-period at the zero-passage of the current, in which case the capacitor is discharged each time with a frequency which is many times higher than the power frequency. For such cases the capacitor must be able to withstand a higher voltage, which increases the cost.

In capacitor banks, known up to the present, for maintaining the stability by compensation with series capacitors protected by self-extinguishing or non-self-extinguishing gaps, the great disadvantage remains that the stabilization is interrupted for a considerable length of time when an over-voltage occurs in the capacitor at the very moment when the stability is highly stressed.

SUMMARY OF THE INVENTION

The present invention relates to a series capacitor bank for achieving an uninterrupted stabilization of the condition of operation in high-voltage electric power supply networks. It comprises a capacitor and a safety circuit, known per se and connected in parallel with the capacitor, for short-circuiting the capacitor when the network is subjected to such disturbances which cause overvoltages detrimental to the capacitor. According to the invention, a current path is arranged in parallel with the capacitor and said safety circuit, said current path comprising a voltage-dependent resistor for controlling the current through the current path in dependence on the voltage across the capacitor. This resistor has a very high resistance as long as the voltage across the capacitor is below a predetermined value which is dependent on the electric properties of the capacitor, said value being higher than the operational voltage of the capacitor but lower than the voltage at which said safety circuit becomes effective and short-circuits the capacitor, whereas the resistance of the resistor decreases strongly for voltages exceeding said predetermined value.

By arranging a current path, according to the invention, which shunts the capacitor and which contains resistor elements which are not negligible and means which opens the current path before an arising overvoltage has reached a value which is detrimental to the capacitor, and before the known short-circuiting circuit has been able to operate, a series capacitor device is obtained showing extremely good advantages compared to what has been obtained with known capacitor banks.

1. The resistance in the current path always has a value which is not negligible, which means that the capacitor is never short-circuited. Its stabilizing effect in the network always remains, even if it is somewhat reduced.

2. By using a voltage-dependent resistor in the current path, a smooth shunting of the current through the capacitor is obtained and a smooth reinsertion of the capacitor when the overvoltage transients are reduced.

3. Because of the inherent properties of the voltage-dependent resistor in the current path, this will intervene and open smoothly as soon as the voltage across the capacitor reaches the predetermined value. the current path is therefore open only during the short intervals of the half-periods of the voltage when the instantaneous value of the voltage exceeds the said predetermined value. This means that the current through the current path consists of relatively short current pulses during the said intervals of the voltage cycle. The rest of the current passes through the capacitor, which therefore maintains the stabilization. The said smooth connection and disconnection considerably reduces the occurrence of transients and suppresses the tendency to produce harmful sub-harmonics.

BRIEF DESCRIPTION OF THE DRAWINGS

In the enclosed drawing.

DESCRIPTION OF THE PREFERRED EMBODIMENTS

Figure 1:
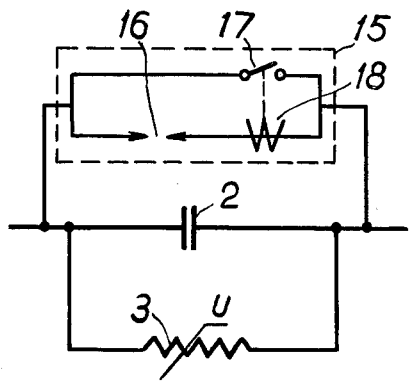
FIG. 1 shows a series-capacitor connected in parallel with a non-linear resistor.

FIG. 1 illustrates a power transmission line 1, in which a seriescapacitor 2 intended for compensation of the line reactance is inserted. The capacitor is connected in parallel with a known safety circuit 15 for short-circuiting the capacitor if the voltage across it reaches a dangerous value. According to the example shown, the safety circuit comprises a normally open breaker 17, connected in series with a spark gap 16 and a current-sensing device 18 arranged in series with the gap. Said device 18 is intended to provide the breaker with a closing impulse at a certain time after the gap 16 has ignited for an overvoltage. This circuit will be omitted in the other figures since it is insignificant for an understanding of the invention. A current path is arranged in parallel with the capacitor, which current path comprises a non-linear resistor 3, the resistance of which depends on the voltage across the resistor. During normal conditions the voltage across the capacitor, and accordingly across the resistor, is such that only an insignificant standing current passes through the resistor. If a fault of such a type occurs in the network that an overvoltage causes increased voltage across the capacitor, the resistance of the resistor starts decreasing with increasing voltage, and part of the line current passes through the resistor, thus causing its resistance to decrease still more. The result is that the voltage across the capacitor is prevented from reaching such high values that the capacitor may be damaged.

Furthermore, the shunting by means of the voltage-dependent resistor, which is never disconnected, will maintain the voltage across the capacitor at a certain value lying just below the maximally allowed safety level, fairly independently of the magnitude of the line current. The compensating effect of the capacitor on the line reactance will therefore decrease only slightly during the entire time that the fault causes an increased line current, and this is regulated automatically so that the highest possible compensation is obtained.

In order to prevent the line current from constantly passing through the non-linear resistor, a spark gap can be connected in series with resistor. According to FIG. 2 this gap is a self-extinguishing gap 4, which is ignited when the capacitor voltage exceeds a value which is determined by the dimensioning of the gap. Since the capacitor is not rapidly discharged after the gap has been ignited and has shunted the capacitor, but its voltage follows the power frequency even after the ignition of the gap, the capacitor does not have to be dimensioned according to the principles previously explained in connection with the use of self-extinguishing gaps without series resistors.

Because the stability is improved in comparison with previously used capacitor banks, it is safe to assume that the degree of compensation $X_C/X_L$ can always be restricted to below 50%, $X_C$ being the reactance of the capacitor and $X_L$ the reactance of the line. This will make it possible to use simple relay protection devices for the line, the whole compensation being concentrated near its center. This, in addition to the fact that a breaker and an automatic breaker system are not necessary, means that it is not required to place the capacitor in switching stations where supervision is provided, especially as the capacitors are provided with internal fuses. Further it should be noted that the short-circuiting currents out on the line are approximately 10% of the short-circuiting currents in switching stations. The cost of a somewhat more expensive damping resistor and spark gap is probably outbalanced by the reduced cost of the capacitor and a more simple and safe transmission.

Figure 2:
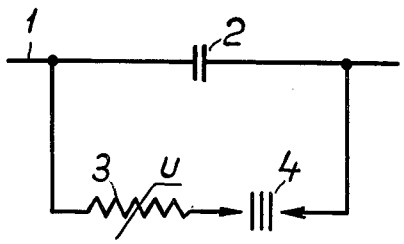
FIG. 2 shows the resistor in series with a self-extinguishing gap.
Figure 3:
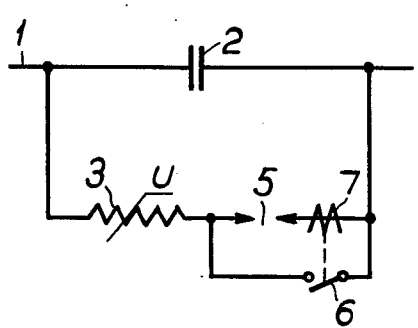
FIG. 3 shows the use of a gap which is non-self-extinguishing in parallel with a breaker for extinguishing the gap.
Figure 4:
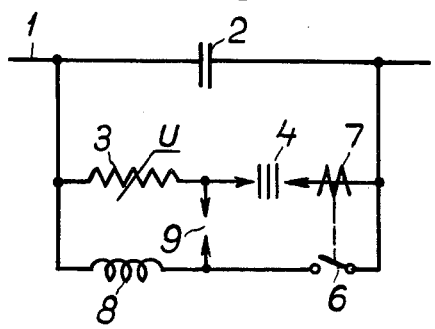
FIG. 4 shows the device completed with a breaker for short-circuiting the capacitor.

FIG. 3 shows an alternative to the device according to FIG. 2. The self-extinguishing gap 4 in FIG. 2 is replaced in FIG. 3 by a normal, non-self-extinguishing gap 5, which is then connected in parallel with a breaker 6 for extinguishing the gap. The breaker is controlled by current-sensing devices 7 in the gap circuit. In order to make possible operations on and supervision of the capacitor or its exchange, it must be possible to disconnect it. For this purpose a breaker and a number of isolators are used for short-circuiting the capacitor. The breaker is also supposed to operate as a thermal protection for gaps and resistors if the gap burns too long, so that the temperature for the resistor 3 becomes too high. FIG. 4 shows the capacitor 2 with a parallel branch containing the resistor 3 and a self-extinguishing gap 4. The breaker 6 is connected in a second parallel branch which also comprises a reactor 8 having low reactance for power frequency. When the breaker is closed, the voltage drop across the capacitor will therefore be low. An auxiliary gap 9 is connected between the two parallel branches. If a fault does not disappear after a normal period of time, so that the gap 4 continues to burn, the breaker 6 is closed under the action of the current-sensing device 7. Then the reactor 8 is connected in. The resistor 3 is then shunted by the reactor. This causes the gap 4 to expire and the current passes only through the reactor 8, which has now low reactance. If the capacitor 2 should not be sufficiently discharged, the auxiliary gap 9 will be ignited and the resistor 3 will assist in damping the discharging current. The voltage-dependent resistor 3 contributes positively to limit the current through the reactor during the first period after the breaker has been closed, but causes the current to be increasingly transferred to the reactor as the voltage across the capacitor drops. This means that the inherent properties of the voltage-dependent resistor are utilized in a favorable manner.

If the breaker 6 is closed without the gap 4 having been ignited, the capacitor voltage will be applied over the reactor and the auxiliary gap 9 which is then ignited and connects the resistor in parallel with reactor, thus obtaining the necessary damping. The resistance of the resistor increases rapidly and, as the reactance of the reactor is less than the resistance of the resistor at power frequency, the current through the resistor decreases rapidly and the auxiliary gap expires and the capacitor is short-circuited across the reactor and the breaker.

Figure 5:
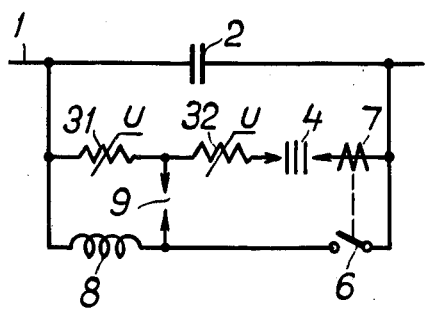
FIG. 5 shows the device according to FIG. 4, but with the non-linear resistor divided into two partial resistors.
Figure 6:
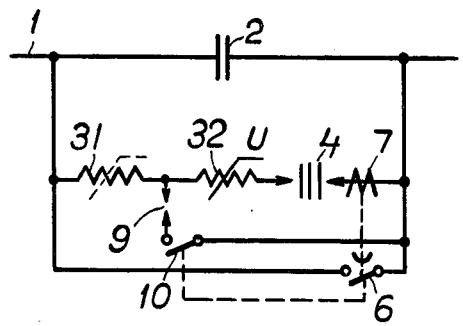
FIG. 6 shows the device according to FIG. 5, but working without a reactor.

FIG. 5 shows how the connection according to FIG. 4 may be modified by dividing the resistor 3 into two series-connected parts 31 and 32 and connecting the auxiliary gap 9 between the two partial resistors. FIG. 6 shows a modification of the connection according to FIG. 5. The main contact of the breaker 6 has a delayed operation, but an auxiliary contact 10 has an instantaneous operation. The auxiliary gap 9 is ignited as soon as the auxiliary contact is closed. If the spark gap 9 is ignited when the auxiliary contact is closed, the spark gap will be short-circuited and expire. If, on the other hand, the spark gap is not ignited, the partial resistor 31, which may be linear or non-linear, will be connected when the auxiliary gap 9 is ignited and the capacitor starts discharging. Because of the delayed operaton of the main contact, part of the capacitor energy can be discharged through the partial resistor 31 before the main contact is closed. Short-circuiting of the capacitor can then be effected without damage to capacitors or breaker contacts.

We claim:

1. Series capacitor bank for achieving an uninterrupted stabilization of the condition of operation in high-voltage electric power supply networks with a capacitor, and a back-up safety circuit connected in parallel with the capacitor, said safety circuit including means responsive to disturbances of a magnitude which causes overvoltages which may damage the capacitor to short-circuit the capacitor, comprising a first current path in parallel with the capacitor and said safety circuit, said first current path including a spark gap in series with a voltage-dependent resistor for controlling the current through the current path in dependence on the voltage across the capacitor, said resistor means having a very high resistance as long as the voltage across the capacitor is below a predetermined value which is dependent on the electric properties of the capacitor, said value being higher than the operating voltage of the capacitor but lower than the voltage at which said safety circuit becomes effective and short-circuits the capacitor, the resistance of the resistor means decreasing for voltages exceeding said predetermined value, whereby said capacitor is not short-circuited by said safety circuit with voltages between said operating voltage and said predetermined voltage.

2. Capacitor bank according to claim 1, having a second current path parallel to said first current path, the second current path comprising a reactor and a breaker, and a spark gap connected between the two current paths.

3. Capacitor bank according to claim 2, in which the resistor means comprises two partial resistors and said reactor is connected in parallel with only one of the partial resistors.

4. Capacitor bank according to claim 1, in which the resistor means comprises two series-connected partial resistors, a breaker having a main contact with delayed operation connected in parallel with the capacitor and an auxiliary contact means with instantaneous operation, to short-circuit the spark gap and the partial resistor located nearest the spark gap over an auxiliary spark gap before the main contact is closed.

* * * * *